July 9, 1946.  H. OGARD  2,403,607
V-BELT CONSTRUCTION
Filed Dec. 21, 1942
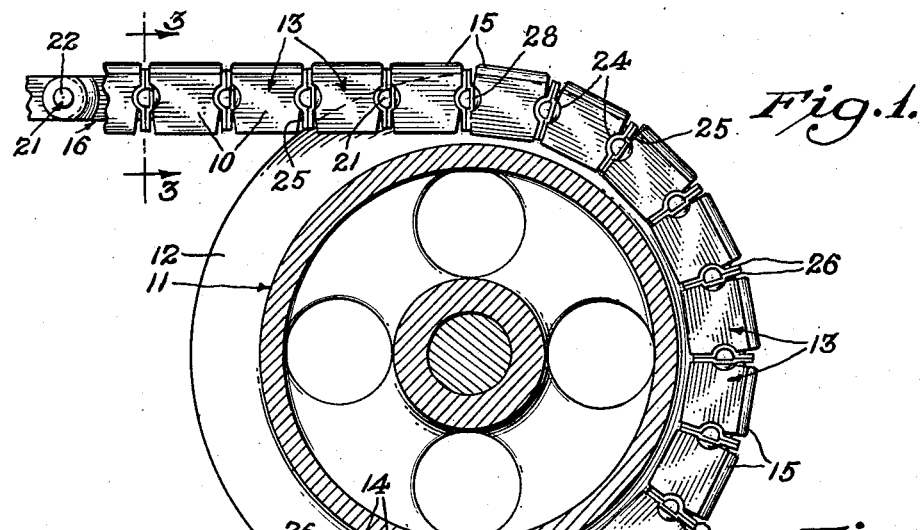
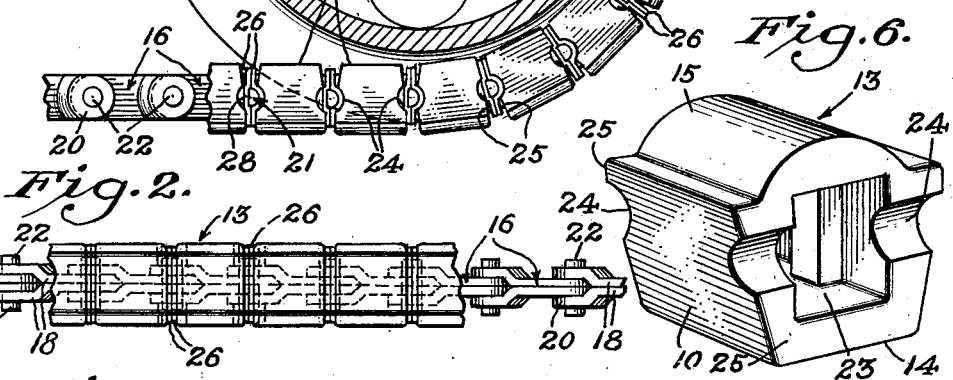
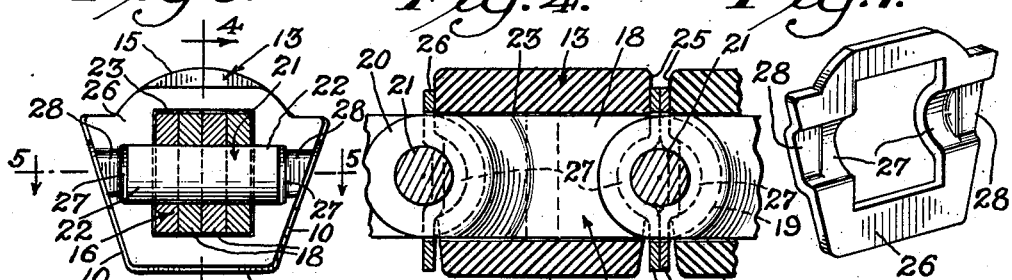
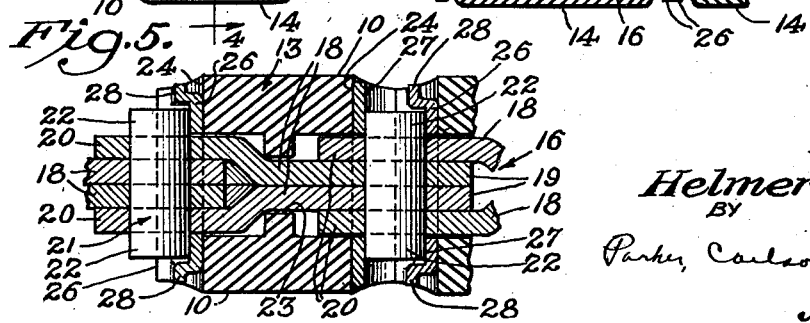
Inventor
Helmer Ogard
BY
Parker, Carlson, Pitzner Hubbard
Attorneys.

Patented July 9, 1946

2,403,607

UNITED STATES PATENT OFFICE 2,403,607

V-BELT CONSTRUCTION

Helmer Ogard, Chicago, Ill., assignor to Armstrong-Bray & Co., Chicago, Ill., a corporation of Illinois Application December 21, 1942, Serial No. 469,588

8 Claims. (Cl. 74—236)

This invention relates to belts of the so-called V-type having tapering side walls which frictionally engage complemental walls on driving and driven pulleys or sheaves.

Ordinarily, such belts are composed of reinforced rubber and molded as a single integral piece. These are subject to well recognized objections such as stretching in service use which necessitates replacement or adjustment and in multiple belt drives results in uneven distribution of the load. Single piece belts are difficult to install in certain machines and must be stocked in large quantities because of the many sizes and lengths in which they are used.

The general object of the present invention is to overcome these and other disadvantages through the provision of a V-belt composed of detachably connected sections.

Another object is to provide a V-belt in which the driving force is transmitted by a flexible non-extensible chain frictionally connected to the sheaves through a series of V-blocks carried by the chain links and composed of resilient friction material such as rubber.

A further object is to provide a novel connection between each chain link and the associated V-block.

The invention also resides in the novel structural character of the parts which facilitates molding of the V-blocks and the formation of the metal parts as sheet metal stampings.

Other objects and advantages of the invention will become apparent from the following detailed description taken in connection with the accompanying drawing, in which Figure 1 is a fragmentary side elevational view of a V-belt embodying the present invention, one belt pulley being shown in section.

Fig. 2 is a fragmentary plan view of the belt.

Fig. 3 is a section taken along the line 3—3 of Fig. 1.

Figs. 4 and 5 are sections taken respectively along the lines 4—4 and 5—5 of Fig. 3.

Fig. 6 is a perspective view of one of the V-blocks.

Fig. 7 is a perspective view of one of the buttress plates.

While the invention is susceptible of various modifications and alternative constructions, I have shown in the drawing and will herein describe in detail the preferred embodiment. It is to be understood, however, that I do not intend to limit the invention by such disclosure but aim to cover all modifications and alternative constructions falling within the spirit and scope of the invention as expressed in the appended claims.

The improved belt shown is of the type in which side surfaces 10 composed of rubber, synthetic rubber, or friction material having comparable physical properties taper and converge toward each other so as to fit into the V-groove in a pulley or sheave 11. In passing around the pulley, the belt becomes compressed between the groove walls 12 with sufficient force to transmit the torque without substantial slippage.

In accordance with the present invention, the belt surfaces 10 constitute the opposite sides of relatively short molded blocks 13 which have a generally flat bottom surface 14 and preferably a bulging outer surface 15. The blocks are hollow and arranged in end-to-end relation along an endless flexible chain comprising relatively short detachably connected links 16 which are composed of metal such as heat-treated steel so that the chain is non-extensible.

The individual chain links are flat at one end and bifurcated at the other to receive the flat end of the adjacent link. To enable the links to be punched from sheet metal, each is composed of two pieces 18, lying against each other at their flat ends 19 and spaced apart at the bent ends 20. Both ends are apertured to snugly receive a pivot pin 21 whose ends 22 project laterally a short distance beyond the outer surfaces of the link ends 20. If desired, the pin may be composed of bronze or other bearing metal.

The links 16 extend loosely through holes 23 molded in the blocks 13 centrally thereof and having enlarged end recesses to receive the overlapping ends of the adjacent links. Concave recesses 24 are molded in opposite ends of the blocks to receive the pin ends 22 and thus permit the blocks to be located close together with the pins 21 disposed between them. In longitudinal cross-section, the end surfaces 25 of the blocks converge inwardly to a small degree to permit bending of the belt around the pulley in spite of the close spacing of the blocks.

The blocks 13 may be composed of solid rubber or like material and need not incorporate reinforcing cords because the driving force is transmitted by the metallic chain. The increments of this force derived frictionally at the surfaces 10 of the respective blocks are transmitted individually to the chain links 16 through the medium of the projecting pin ends 22. These have bearing engagement with buttress plates 26 which are of the same general shape as the end surfaces 25 of the blocks but are slightly smaller in area so as to allow for compression of the blocks in the pulley grooves. The plates are deformed as indicated at 27 so as to seat in the block recesses 24 and provide recesses on the other side for reception of the pin ends 22. There are two plates 26 between each adjacent pair of blocks 13 and these are arranged with their deformed portions 27 disposed in the recesses 24 of the different blocks. One plate of each pair lies in full contact with the block ends 25 to which the increment of the transmitted force is thus distributed evenly. Beyond the ends of the pins 21, one plate 26 of each pair is deformed to a lesser degree so as to provide portions 28 which engage the pin ends 22 and prevent any possible endwise displacement of the pins. In assembling the parts, the blocks are compressed sufficiently to permit entry of the pins through the chain links past one of the plate portions 28. Thereafter, the resiliency of the blocks serves to hold the plates tightly against the pins.

It will be observed that the belt constructed as above described may be made up in any desired length simply by selecting the proper number of sections. The maintenance of a large stock of different belt sizes is therefore unnecessary. Since the links are connected detachably by the pins, the belt may be assembled readily in any machine and this, without the use of special fasteners. The chain being non-extensible and uniform in length for any given number of sections, the belts will not stretch and, when used in multiple, will always carry equal parts of the load. Through the use of the buttress plates 26 and by connecting each block 13 to the chain, no one block is stressed unduly, and the total driving force is sustained by the chain.

While I have shown and described herein a single belt embodying the features of the present invention, it will be understood that the invention is equally well adapted to belts for both single and multiple belt drives.

I claim as my invention:

1. A V-belt comprising a plurality of chain links each having a bifurcated end straddling the other end of the adjacent link, cross-pins pivotally connecting the overlapping ends of said links with their ends projecting laterally from the links, blocks of yieldable friction material each carried by one of said links and having end recesses receiving said overlapping ends, and a buttress plate disposed between the ends of adjacent blocks and having depressions therein providing seats for said pin ends, whereby the frictional forces applied to said blocks will be transmitted to said pin through the medium of said plate.

2. A V-belt comprising a plurality of chain links each comprising two sheet metal pieces disposed side by side at one end and spaced apart at the other end to receive the adjacent link, pins pivotally connecting the overlapping ends of said links with their ends projecting laterally from the links, blocks of friction material each carried by one of said links and having end recesses receiving said overlapping ends, and plates each abutting one end of each block and having depressions therein providing seats of the projecting ends of said pins.

3. A V-belt comprising a plurality of chain links each comprising two sheet metal pieces disposed side by side at one end and spaced apart at the other end to receive the adjacent link, pins pivotally connecting the overlapping ends of said links with their ends projecting laterally from the links, blocks of friction material each carried by one of said links and having end recesses receiving said overlapping ends, plates each abutting one end of each block and having depressions therein providing seats for the projecting ends of said pins, and means formed on said plates and acting to hold said pins against endwise displacement.

4. A V-belt comprising a succession of apertured blocks having tapering side walls, a succession of links each extending through and supporting one of said blocks, pins pivotally connecting said links and having projecting ends, and a plate interposed between each of said pins and the end of one adjacent block, each plate abutting against said adjacent block and having bearing engagement with said ends of the associated pin.

5. A V-belt comprising a succession of apertured blocks having tapering side walls, a succession of links each extending through and supporting one of said blocks, pins pivotally connecting said links and each disposed at the junctions between two adjacent blocks, and a plate interposed between each of said pins and the end of one adjacent block, each plate abutting against said adjacent block and having bearing engagement with the associated pin.

6. A V-belt comprising a plurality of chain links each having a bifurcated end straddling the other end of the adjacent link, cross-pins pivotally connecting the overlapping ends of said links with their ends projecting laterally from the links, blocks of yieldable friction material each carried by one of said links and having end recesses receiving said overlapping ends, and a buttress plate or plates disposed between the ends of adjacent blocks and having depressions therein providing seats for said pin ends, whereby the frictional forces applied to said blocks will be transmitted to said pin through the medium of said plate or plates.

7. A V-belt comprising a plurality of longitudinally arranged links, pins pivotally connecting the ends of said links, blocks of yieldable friction material carried by the respective links, and buttress plates abutting the ends of said blocks and having portions extending over the ends of the pins to hold the pins against endwise displacement, said blocks being compressible to permit shifting of said portions of the plates away from the ends of the pins for removal and insertion of the latter.

8. A V-belt comprising a plurality of longitudinally arranged links, pins pivotally connecting the ends of said links with the ends of the pins projecting laterally from the links, blocks of yieldable friction material carried by the respective links, and buttress plates abutting the ends of said blocks and having depressions therein to receive the projecting ends of the pins with the portions of the plates adjacent said depressions shaped to extend over the ends of the pins to hold the latter against endwise displacement, the plates being shiftable by compressing said blocks to move said portions away from the ends of the pins to permit removal and insertion of the latter.

HELMER OGARD.